(12) United States Patent
Okamoto et al.

(10) Patent No.: US 9,274,402 B2
(45) Date of Patent: Mar. 1, 2016

(54) IMAGING DEVICE THAT EXECUTES AUTO FOCUS CONTROL BY REFERRING TO DISTANCE IMAGE DATA REGARDING A DEPTH OF A REGION

(71) Applicant: PANASONIC CORPORATION, Osaka (JP)

(72) Inventors: Mitsuyoshi Okamoto, Osaka (JP); Yoshinori Okazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/225,119

(22) Filed: Mar. 25, 2014

(65) Prior Publication Data

US 2014/0293116 A1  Oct. 2, 2014

(30) Foreign Application Priority Data

Mar. 26, 2013 (JP) ................................. 2013-063468
Feb. 18, 2014 (JP) ................................. 2014-028056

(51) Int. Cl.
*H04N 5/232* (2006.01)
*G03B 13/36* (2006.01)
*G03B 17/18* (2006.01)

(52) U.S. Cl.
CPC ............ *G03B 13/36* (2013.01); *H04N 5/23212* (2013.01); *G03B 17/18* (2013.01)

(58) Field of Classification Search
CPC ........................... H04N 5/23212; G03B 13/36
See application file for complete search history.

(56) References Cited

U.S. PATENT DOCUMENTS

| 8,542,313 | B2* | 9/2013 | Rapaport et al. | ............... 348/345 |
|---|---|---|---|---|
| 2009/0003817 | A1* | 1/2009 | Suzuki et al. | ................. 396/124 |
| 2011/0181770 | A1* | 7/2011 | Rapaport et al. | ............... 348/348 |
| 2012/0148109 | A1* | 6/2012 | Kawamura et al. | ........... 382/106 |

FOREIGN PATENT DOCUMENTS

| JP | 2007-199633 A | 8/2007 |
|---|---|---|
| JP | 2010-117593 A | 5/2010 |
| WO | 2007/086378 A1 | 8/2007 |

* cited by examiner

*Primary Examiner* — Gary C Vieaux
(74) *Attorney, Agent, or Firm* — McDermott Will & Emery LLP

(57) ABSTRACT

An imaging device includes: an imaging unit that images a subject image and generates image data; a receiving unit that receives a mode setting to either one of a full AF mode of executing auto focus control by referring to data corresponding to an entire region of an image to be indicated by the image data and a partial AF mode of executing the auto focus control by referring to data corresponding to a partial region of the image to be indicated by the image data; and a controller that, in response to whether the mode is the full AF mode or the partial AF mode, generates first distance image data regarding a depth of the entire region of the image to be indicated by the image data or second distance image data regarding a depth of the partial region of the image to be indicated by the image data.

8 Claims, 6 Drawing Sheets

IMAGING DEVICE THAT EXECUTES AUTO FOCUS CONTROL BY REFERRING TO DISTANCE IMAGE DATA REGARDING A DEPTH OF A REGION

This application claim the benefit of Japanese Application No. 2013-063468, filed on Mar. 26, 2013 and Japanese Application No. 2014-028056, filed Feb. 18, 2014, the disclosures of which Applications are incorporated by reference herein.

BACKGROUND OF THE INVENTION

1. Field of the Invention

The present disclosure relates to an imaging device provided with an AF (Auto Focus) function.

2. Description of the Related Art

As a method for generating distance information from imaged image data to a subject, a method called DFD (Depth From Defocus) is known (for example, refer to Unexamined Japanese Patent Publication No. 2010-117593). The DFD is a method for generating the distance information to the subject in such a manner that a quantitative correlation regarding blurs between a plurality of pieces of image data imaged at a plurality of different focal positions is calculated. Moreover, it is also known to perform AF control by using the distance information obtained by the DFD (for example, refer to International Publication No. 2007/86378).

SUMMARY OF THE INVENTION

The present disclosure provides an imaging device capable of generating more appropriate distance image data.

An imaging device in the present disclosure includes: an imaging unit that images a subject image and generates image data; a receiving unit that receives a mode setting to either one of a full AF mode of executing auto focus control by referring to data corresponding to an entire region of an image to be indicated by the image data and a partial AF mode of executing the auto focus control by referring to data corresponding to a partial region of the image to be indicated by the image data; and a controller that, in response to whether a set mode is the full AF mode or the partial AF mode, generates first distance image data regarding a depth of the entire region of the image to be indicated by the image data or second distance image data regarding a depth of the partial region of the image to be indicated by the image data.

DETAILED DESCRIPTION OF THE PREFERRED EMBODIMENTS

Figure 1:
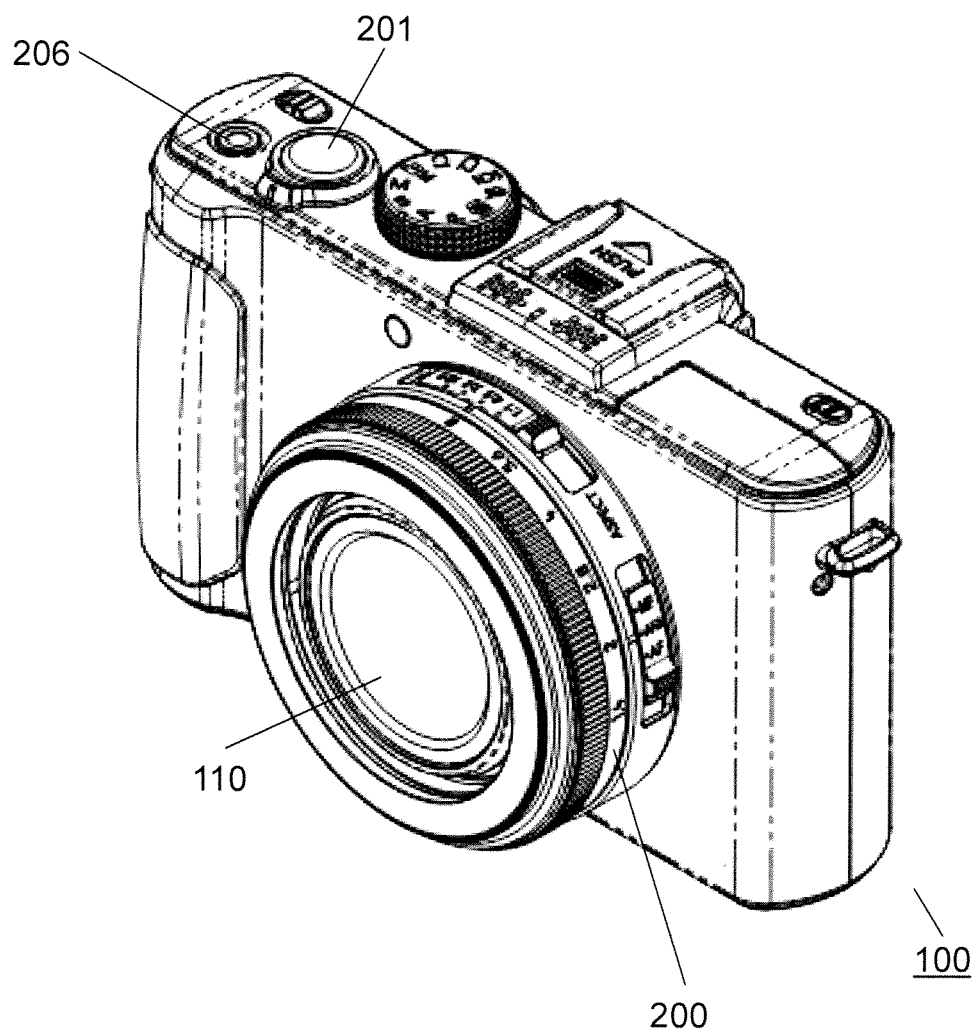
FIG. 1 is a perspective view of a digital camera according to a first exemplary embodiment.

A description is made below of exemplary embodiments in detail while referring to the drawings as appropriate. However, a description more in detail than necessary is sometimes omitted. For example, a detailed description of items already well known and a duplicate description of substantially the same configurations are sometimes omitted. This is in order to avoid unnecessary redundancy of the following description, and to facilitate the understanding of those skilled in the art.

Note that the inventors provide the accompanying drawings and the following description in order to allow those skilled in the art to fully understand the present disclosure, and do not intend to limit thereby the subjects described in the claims.

First Exemplary Embodiment

Digital camera 100 of a first exemplary embodiment is provided with an AF function. A description is made of a configuration and operation of digital camera 100.

[1-1. Configuration]

Figure 2:
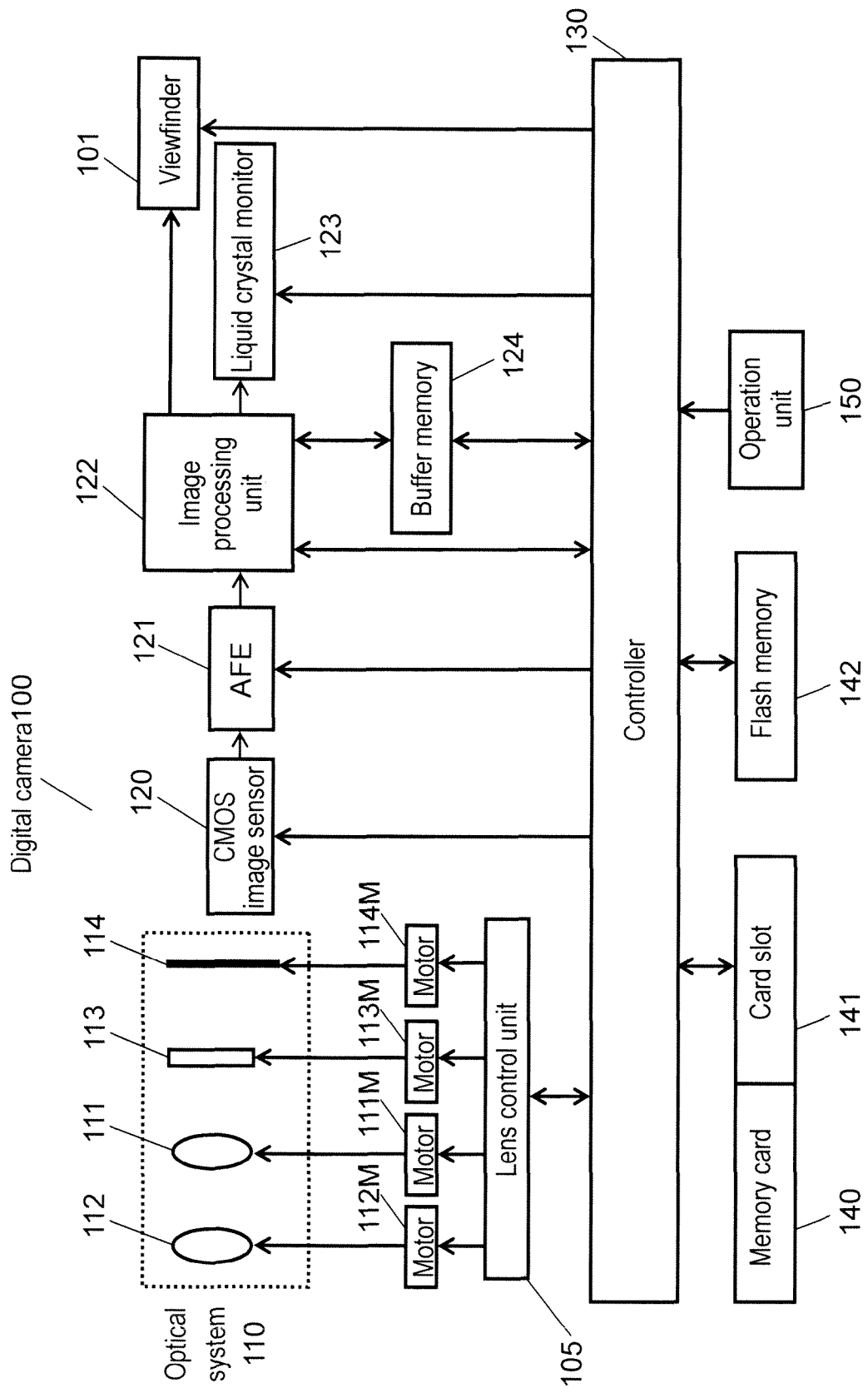
FIG. 2 is a block diagram showing an electrical configuration of the digital camera according to the first exemplary embodiment.

A description is made below of the configuration of digital camera 100 with reference to FIGS. 1 and 2. FIG. 1 is a perspective view of digital camera 100. FIG. 2 is a block diagram showing an electrical configuration of digital camera 100. As shown in FIG. 1, digital camera 100 includes lens barrel 200, which houses optical system 110, on a front surface thereof. Moreover, digital camera 100 includes operation buttons such as still image release button 201 and moving picture release button 206 on an upper surface thereof.

As shown in FIG. 2, digital camera 100 images a subject image, which is formed through optical system 110, by CMOS image sensor 120. CMOS image sensor 120 images the subject image formed on an imaging surface, and generates image data based on the imaged subject image. The generated image data is subjected to a variety of processing in AFE (Analog Front End) 121 and image processing unit 122. The generated image data is recorded in a recording medium such as flash memory 142 and memory card 140. In this exemplary embodiment, the generated image data is recorded in memory card 140 in usual. The image data recorded in memory card 140 is displayed on liquid crystal monitor 123 or viewfinder 101 when a user performs an operation for operation unit 150. A description is made below of details of the respective configurations shown in FIGS. 1 and 2.

Optical system 110 forms the subject image on the imaging surface of CMOS image sensor 120. Optical system 110 is composed of focus lens 111; zoom lens 112; diaphragm 113; shutter 114; and the like. Though not shown, optical system 110 may include an OIS (Optical Image Stabilizer) lens. In this case, based on an output from a blur detector such as an acceleration sensor, controller 130 drives the OIS lens in a direction of reducing a blur of the subject image to be formed on the imaging surface of CMOS image sensor 120. Note that a variety of the lenses which compose optical system 110 may be composed of an arbitrary number of lenses, or of an arbitrary number of groups of the lenses.

Focus lens 111 moves on an optical axis, and thereby adjusts a focus state of the subject. Zoom lens 112 moves on the optical axis, and thereby adjusts an angle of view of the subject. Diaphragm 113 changes a diaphragm value, and thereby adjusts an amount of light to be made incident onto CMOS image sensor 120. Shutter 114 changes a shutter speed, and thereby adjusts an exposure time of the light to be made incident onto CMOS image sensor 120. Focus lens 111 is driven by motor 111M. Zoom lens 112 is driven by motor 112M. Diaphragm 113 is driven by motor 113M. Shutter 114 is driven by motor 114M. Motors 111M to 114M are driven in accordance with a control signal notified from lens control unit 105.

By an instruction from controller 130, lens control unit 105 drives motors 111M to 114M, and controls optical system 110. Lens control unit 105 may be composed of a hard-wired electronic circuit, or may be composed of a microcomputer using a program. Moreover, lens control unit 105 may be composed of one semiconductor chip together with controller 130 and the like.

CMOS image sensor 120 images the subject image formed through optical system 110, and generates the image data. When digital camera 100 is in an imaging mode, CMOS image sensor 120 can generate image data of a new frame every fixed time.

AFE 121 implements a variety of processing for the image data read out from CMOS image sensor 120. For example, for the image data, AFE 121 implements noise suppression by correlated double sampling, amplification to an input range width of an A/D converter by an analog gain controller, and A/D conversion by the A/D converter. Thereafter, AFE 121 outputs the image data, which has been subjected to the variety of processing, to image processing unit 122.

Image processing unit 122 implements the variety of processing for the image data output from AFE 121. As the variety of processing, there are mentioned white balance correction, gamma correction, YC conversion processing, electronic zoom processing, compression processing, expansion processing and the like; however, the variety of processing is not limited to these. Image processing unit 122 acquires a brightness value for automatic exposure control, a depth information value, which is used for AF control, and is obtained by processing that is based on a DFD (Depth From Defocus) algorism, an RGB output value for white balance control, and the like, and notifies controller 130 thereof. The DFD processing will be described later. Image processing unit 122 records the image data, which is subjected to the variety of processing, temporarily in buffer memory 124. Image processing unit 122 may be composed of a hard-wired electronic circuit, or may be composed of a microcomputer using a program. Moreover, image processing unit 122 may be composed of one semiconductor chip together with controller 130 and the like.

Liquid crystal monitor 123 and viewfinder 101 are provided on a back surface of digital camera 100. Liquid crystal monitor 123 and viewfinder 101 display an image to be indicated by the image data processed in image processing unit 122. That is to say, viewfinder 101 is an electronic viewfinder. The image to be displayed by liquid crystal monitor 123 and viewfinder 101 includes a through image and a reproduced image. The through image is an image to be shown by continuously displaying images, each of which is indicated by the image data of the new frame to be generated by CMOS image sensor 120 every fixed time. In usual, when digital camera 100 is in the imaging mode, image processing unit 122 generates the through image from the image data generated by CMOS image sensor 120. The user refers to the through image to be displayed on liquid crystal monitor 123 and viewfinder 101, and thereby can image the subject while confirming a composition thereof. The reproduced image is an image reduced to have a lower pixel value in order to display image data with a high pixel value, which is recorded in memory card 140, on liquid crystal monitor 123 and viewfinder 101 when digital camera 100 is in a reproduction mode. The image data with a high pixel value, which is recorded in memory card 140, is generated by image processing unit 122 based on the image data, which is generated by CMOS image sensor 120, after the user performs the operation for the release button.

Controller 130 is a control unit that controls the whole of digital camera 100. Controller 130 may be composed of a hard-wired electronic circuit, or may be composed of a microcomputer and the like. Moreover, controller 130 may be composed of one semiconductor chip together with image processing unit 122 and the like. In a ROM included in controller 130, a control program for controlling the whole of digital camera 100 is stored. Controller 130 reads out the control program from the ROM in an inside thereof, then executes the control program, and thereby controls the whole of digital camera 100. Moreover, it is not necessary that the ROM be an internal configuration of controller 130, and the ROM may be provided on an outside of controller 130.

Buffer memory 124 functions as a work memory of image processing unit 122 and controller 130. Buffer memory 124 can be realized by a DRAM (Dynamic Random Access Memory) and the like. Moreover, flash memory 142 functions as an internal memory for recording the image data, setting information of digital camera 100, and the like.

Card slot 141 is a slot through which memory card 140 is insertable. Card slot 141 can connect memory card 141 to digital camera 100 electrically and mechanically. Moreover, card slot 141 may be provided with a function to control memory card 140.

Memory card 140 is an external memory that includes a recording portion such as a flash memory in an inside thereof. Memory card 140 can record data such as the image data to be processed by image processing unit 122.

Operation unit 150 is a generic name of the operation buttons and an operation dial, which are provided on an outer package of digital camera 100. Operation unit 150 receives an operation by the user. For example, still image release button 201 and moving picture release button 206, which are shown in FIG. 1, and a cross button and a touch panel, which are not shown, and the like correspond to operation unit 150. Upon receiving the operation by the user, operation unit 150 notifies controller 130 of a variety of operation instruction signals.

Still image release button 201 is a two-step depression-type button including a half-depressed state and a fully-depressed state. When still image release button 201 is half-depressed by the user, controller 130 executes AF (Auto Focus) control and AE (Auto Exposure) control, and decides imaging conditions. Subsequently, when still image release button 201 is fully depressed by the user, controller 130 performs imaging processing. Controller 130 records image data, which is imaged at the timing of full depression, as a still image in a memory card 140 and the like.

Moving picture release button 206 is a depression-type button for instructing start/end of moving picture recording. When moving picture release button 206 is depressed by the user, controller 130 sequentially records image data, which is generated by image processing unit 122 based on the image data generated by CMOS image sensor 120, as a moving picture in the recording medium such as memory card 140. When moving picture release button 206 is depressed one more time, the moving picture recording is ended.

Note that CMOS image sensor 120 is an example of an imaging unit. Operation unit 150 is an example of a receiving unit. Image processing unit 122 is an example of a processing unit. Controller 130 is an example of a controller.

[1-2. Operation]

[1-2-1. Imaging Operation of Digital Camera 100]

Figure 3:
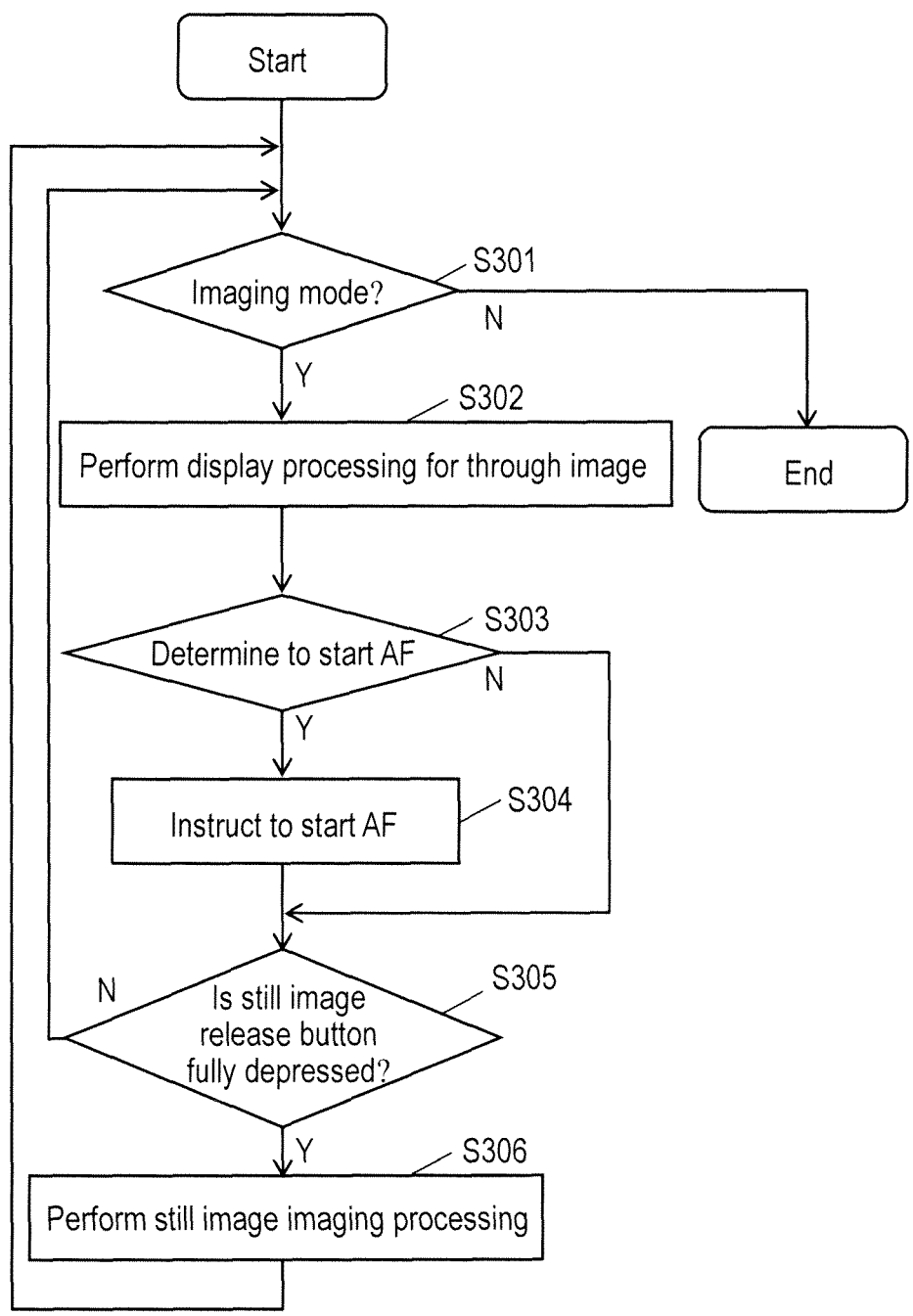
FIG. 3 is a flowchart showing a flow of processing in an imaging mode according to the first exemplary embodiment.

A description is made of an imaging operation of digital camera 100 with reference to FIG. 3. FIG. 3 is a flowchart showing a flow of processing at a time of the imaging mode of digital camera 100. Note that it is supposed that digital camera 100 can simultaneously execute: an operation of imaging and recording an image in response to an imaging instruction by the user while displaying the through image in the imaging mode; and an operation of performing the AF control in accordance with an instruction to start the AF control during the imaging operation. Digital camera 100 can image a moving picture and a still image in the imaging mode, and here, a description is made of imaging of a still image.

When a power supply is turned on by the user, controller 130 determines whether or not an operation mode of digital camera 100 is set in the imaging mode (S301). Upon determining that the operation mode is not set in the imaging mode, controller 130 ends processing in the imaging mode.

Meanwhile, upon determining in Step S301 that the operation mode of digital camera 100 is set in the imaging mode, controller 130 controls CMOS image sensor 120 to perform the imaging operation and to output image data (S302). Moreover, controller 130 controls image processing unit 122 to process the image data, which is output by CMOS image sensor 120, and to generate a through image (S302). Controller 130 causes at least any of liquid crystal monitor 123 and viewfinder 101 to display the generated through image (S302). In digital camera 100 of this exemplary embodiment, controller 130 switches an output destination based on an instruction by the user.

Upon starting the display of the through image, controller 130 determines whether or not to start AF processing (S303). Specifically, controller 130 determines whether or not the instruction to start the AF is received from the user, and whether or not previous AF processing is completed in a case where the previous AF processing is started, and thereby determines whether or not to start the AF processing. More specifically, in a case where the instruction to start the AF is received from the user, and the previous AF processing is started and completed, and in a case where the instruction to start the AF is received from the user, and the previous AF processing is not started, then controller 130 determines to start the AF processing (Y in S303). Meanwhile, otherwise, controller 130 determines not to start the AF processing (N in S303).

Examples of the instruction to start the AF include: half depression of still image release button 201 by the user; a touch operation for the touch panel (not shown) by the user; and sensing of approach to an eye by an eye approach detection sensor (not shown).

Upon determining to start the AF processing in Step S303, controller 130 starts the AF processing (S304). Specifically, controller 130 starts control that is in accordance with a flowchart shown in FIG. 4. Note that the AF processing is executed simultaneously with the processing in the imaging mode that is in accordance with the flowchart shown in FIG. 3. Details of the AF processing will be described later.

Meanwhile, upon determining not to start the AF processing in Step S303, controller 130 does not start the AF processing in Step S304, and shifts to Step S305.

Upon starting the AF processing in Step S304, or upon determining not to start the AF processing in Step S303, controller 130 determines whether or not full depression of still image release button 201 is performed by the user (S305). Upon sensing the full depression of still image release button 201, controller 130 executes still image imaging processing (S306). Meanwhile, in a case of not sensing the full depression of still image release button 201 in Step S305, controller 130 repeatedly executes the processing starting from Step S301. Moreover, upon completing the still image imaging processing in Step S306, controller 130 repeatedly executes the processing starting from Step S301.

[1-2-2. AF Processing of Digital Camera 100]

Figure 4:
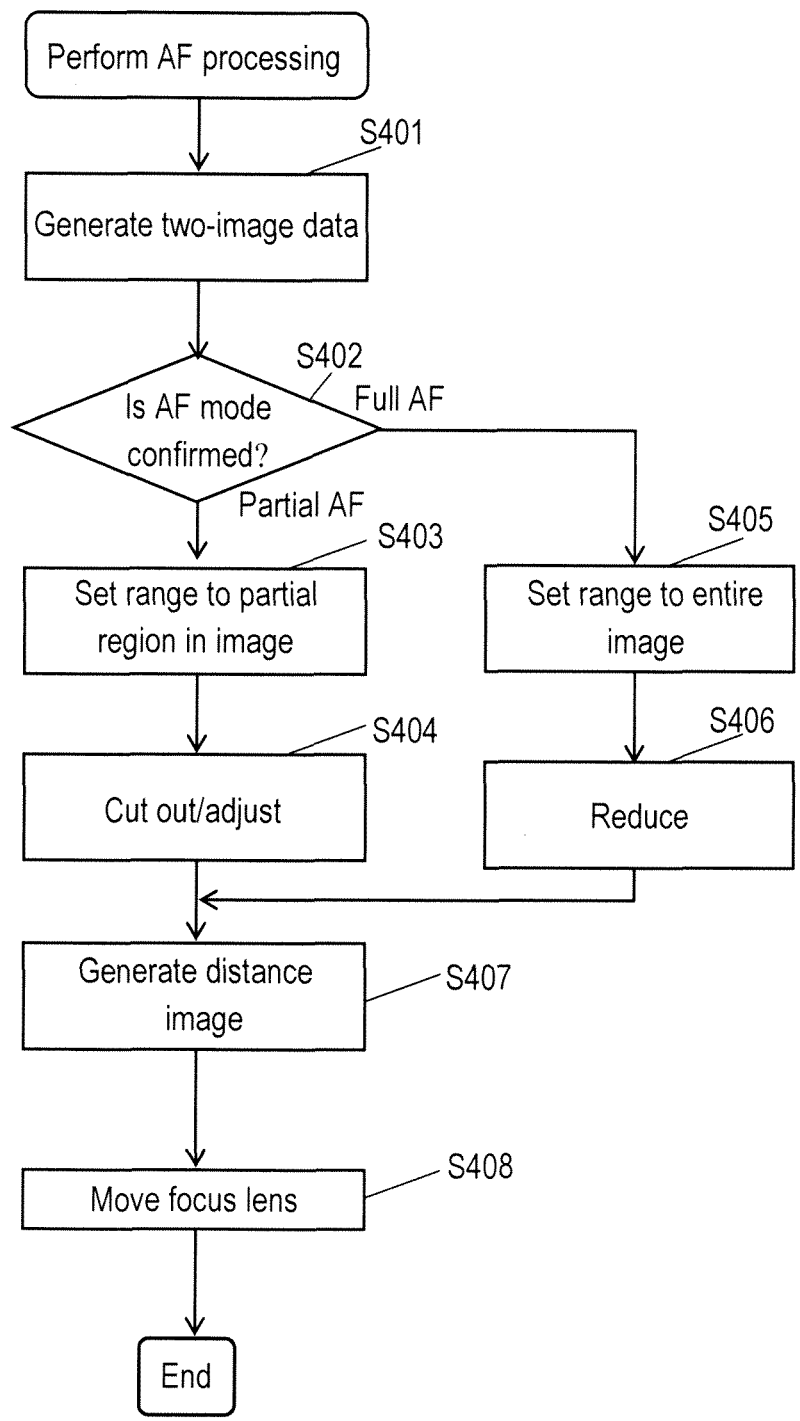
FIG. 4 is a flowchart showing a flow of AF processing according to the first exemplary embodiment.
Figure 5:
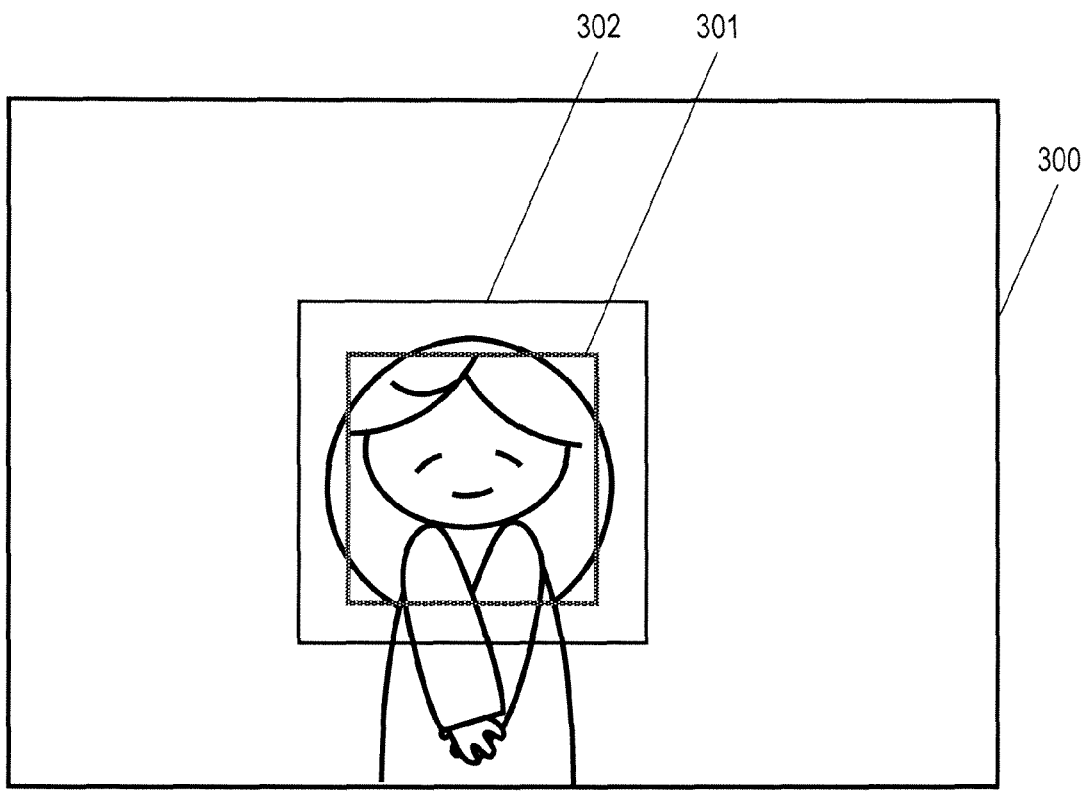
FIG. 5 is a schematic view showing a relationship between a size of an AF frame and a size of a target region of DFD processing according to the first exemplary embodiment.

A description is made of details of the AF processing of digital camera 100 with reference to FIGS. 4 and 5. FIG. 4 is a flowchart showing a flow of the AF processing. FIG. 5 is a schematic view showing a relationship between a size of an AF frame and a size of a target region of the DFD processing.

Upon starting the AF processing in Step S304 in the flowchart shown in FIG. 3, controller 130 starts processing, which is in accordance with the flowchart shown in FIG. 4, simultaneously with the processing that is in accordance with the flowchart shown in FIG. 3. Upon starting the AF processing, controller 130 moves focus lens 111 along the optical axis, and controls CMOS image sensor 120 to image two images different in focusing state (S401). Controller 130 controls image processing unit 122 to generate two-image data based on the two imaged images different in focusing state (S401).

When the two-image data is generated, controller 130 determines whether a set AF mode is a full AF mode or a partial AF mode (S402). Here, the partial AF mode refers to an AF mode of executing the auto focus control by referring to data corresponding to a partial region of the image to be indicated by the imaged image data. For example, to the partial AF mode, there apply: a center single point AF mode; a touch AF mode of receiving an instruction regarding a focusing position from the user through the touch panel (not shown); a face AF mode of detecting a position of a human face of the subject and focusing on the detected position of the face; a tracking AF mode of tracking a specific subject and keeping on focusing thereon; and the like. Moreover, the full AF mode refers to an AF mode of executing the auto focus control by referring to data corresponding to an entire region of the image to be indicated by the imaged image data. For example, to the full AF mode, there apply: a so-called multi-AF mode; an AF mode of focusing on a subject, which is present at a position closest to the camera among subjects present in the imaged image; and the like. Note that the AF mode is set by controller 130 in response to an operation for operation unit 150 by the user, and is then recorded in buffer memory 124. For example, in a case where the AF mode is the touch AF mode, then in Step S303 in FIG. 3, controller 130 detects a position, at which the user performs a touch operation for the touch panel (not shown), and records the position in buffer memory 124.

In Step S402, in a case of determining that digital camera 100 is set in the partial AF mode, controller 130 sets the partial region of the image, which is to be indicated by the imaged image data, to a region for use in the DFD processing (S403). The region for use in the DFD processing becomes a region including a partial region in the image data decided as a region to be focused in the partial AF mode. For example, as shown in FIG. 5, in a case where digital camera 100 is set in the face AF mode, it is supposed that an AF region 301 becomes the region decided as the region to be focused in the partial AF mode. In this case, the region for use in the DFD processing becomes a DFD region 302, which is wider by one size than AF region 301 and includes AF region 301. Moreover, if digital camera 100 is set in the center single point AF mode, then the region decided as the region to be focused in the partial AF mode becomes a region located at a center of the imaged image data. In this case, the region for use in the DFD processing becomes a region including the region located at the center of the imaged image data. Furthermore, if digital camera 100 is set in the touch AF mode, then the region decided as the region to be focused in the partial AF mode becomes a partial region that takes, as a reference, a touch position by the user, which is detected in Step S303 in FIG. 3.

In this case, the region for use in the DFD processing becomes a region including the partial region that takes the touch position as a reference.

Upon deciding the region for use in the DFD processing in Step S403, controller 130 controls image processing unit 122 to cut out image data, which correspond to the decided region, from the two-image data generated in Step S401, and to adjust the cutout image data to a size of the image data necessary for the DFD processing (S404). Here, the two-image data for the DFD processing, which is thus obtained, is image data, which is different in blur amount from each other, at a corresponding position in the image data.

Meanwhile, in a case of determining in Step S402 that digital camera 100 is set in the full AF mode, controller 130 sets the entire region of the image, which is to be indicated by the imaged image data, to the region for use in the DFD processing (S405). Upon deciding the region for use in the DFD processing, controller 130 controls image processing unit 122 to adjust the two-image data, which is generated in Step S401, to the size of the image data necessary for the DFD processing (S406).

When the two-image data for the DFD processing is generated in Step S404 or Step S406, controller 130 controls image processing unit 122 to execute the DFD processing by using the generated two-image data for the DFD processing, and to generate distance image data (S407). Here, the distance image data is image data in which the respective pieces of pixel information indicate not RGB information or brightness information but depth information related to a distance from the camera to the subject. For example, it is supposed that the distance image data is 8-bit data in which the respective pieces of pixel information are 0 to 255. In this case, the distance image data makes a closest pixel be 0, makes an infinite pixel be 255, and expresses depth degrees of the respective pixels.

In the case where the AF mode is set in the partial AF mode, the image data for the DFD processing is image data corresponding to a partial image obtained by cutting out the partial region of the entire image to be indicated by the imaged image data. The distance image data generated by taking the image data, which corresponds to the partial image, as the image data for the DFD processing has depth information with respect to an angle of view in a range narrower than the entire image to be indicated by the imaged image data. Meanwhile, in the case where the AF mode is set in the full AF mode, the image data for the DFD processing is image data corresponding to the entire image to be indicated by the imaged image data. The distance image data generated by taking the image data, which corresponds to the entire image, as the image data for the DFD processing has depth information with respect to the entire image to be indicated by the imaged image data. Note that a necessary size of the image data for the DFD processing is predetermined. Hence, the distance image data generated in the case where the AF mode is set in the partial AF mode has the depth information for each smaller number of pixels than in the distance image data generated in the case where the AF mode is set in the full AF mode.

When the distance image data is generated in Step S407, controller 130 decides a position of focus lens 111 based on the depth information to be indicated by the distance image data (S408). For example, in the case where the AF mode is set in the partial AF mode, controller 130 acquires depth information, which corresponds to a position decided as the region to be focused, in the distance image data, and refers to the acquired depth information, and thereby decides the position of focus lens 111. Meanwhile, in the case where the AF mode is set in the full AF mode, controller 130 searches regions, which have a predetermined area or more and have depth information approximate to each other, from the closest side in the distance image data, and decides a position of focus lens 111, which corresponds to the depth information of the found regions. Controller 130 instructs lens control unit 105 to move focus lens 111 to the decided position (S408). Lens control unit 105 drives motor 111M to move focus lens 111 to the position thus instructed (S408).

[1-3. Effects and the Like]

As described above, digital camera 100 according to this exemplary embodiment includes: CMOS image sensor 120; operation unit 150; and image processing unit 122. CMOS image sensor 120 images the subject image, and generates the image data. Operation unit 150 receives a mode setting to either one of the full AF mode and the partial AF mode. Here, the full AF mode is the AF mode of executing the auto focus control by referring to the data corresponding to the entire region of the image to be indicated by the image data. The partial AF mode is the AF mode of executing the auto focus control by referring to the data corresponding to the partial region of the image to be indicated by the image data. Moreover, in response to whether digital camera 100 is set in the full AF mode or the partial AF mode, image processing unit 122 generates first distance image data regarding the depth of the entire region of the image to be indicated by the image data, or second distance image data regarding the depth of the partial region of the image to be indicated by the image data.

In this way, digital camera 100 can generate more appropriate distance image data in response to a type of the AF mode thus set.

Moreover, in digital camera 100 according to this exemplary embodiment, image processing unit 122 generates the first distance image data regarding the depth of the entire region of the image to be indicated by the image data in the case where digital camera 100 is set in the full AF mode. Meanwhile, in the case where digital camera 100 is set in the partial AF mode, image processing unit 122 generates the second distance image data regarding the depth of the partial region of the image to be indicated by the image data.

In this way, in the case of being set in the partial AF mode, digital camera 100 can increase resolving power of the distance image data in a range necessary for the auto focus control. Moreover, in the case of being set in the full AF mode, digital camera 100 can generate the distance image data of the entire image.

Moreover, digital camera 100 according to this exemplary embodiment further includes controller 130 that executes the auto focus control. Controller 130 executes the auto focus control based on the first distance image data in a case where the first distance image data is generated by image processing unit 122, and executes the auto focus control based on the second distance image data in a case where the second distance image data is generated by image processing unit 122.

In this way, digital camera 100 can execute the auto focus control, which is performed in the case of being set in the partial AF mode, with higher accuracy. Moreover, digital camera 100 can focus on any location of the entire image in the case of being set in the full AF mode.

Moreover, in the case where digital camera 100 according to this exemplary embodiment is set in the partial AF mode, image processing unit 122 generates the distance image data regarding the depth of a first partial region, and controller 130 refers to the distance image data regarding the depth of a second partial region, which is included in the first partial region and is smaller than the first partial region, and thereby executes the auto focus control.

A description is next made of a reason why digital camera 100 performs the control as described. The partial AF mode includes an AF mode, such as the face AF mode and the tracking AF mode, where there is a possibility that the region to be focused move. In the AF mode where there is a possibility that the region to be focused move, there is a case where a designated focused region has moved during a period until the distance image data is generated after designation of such a focused region is received from the user. For example, in the case where digital camera 100 is set in the face AF mode, there is a case where a face region of the subject at a time when the start of the AF is instructed from the user and a face region of the subject at a time when the distance image data is generated differ from each other. Supposing that the distance image data is generated only for the same region as the region designated as the focused region from the user, in a case where the designated focused region has moved while digital camera 100 is generating the distance image data, sufficient distance image data for the region corresponding to the designated focused region is not generated. In this connection, in the case of being set in the partial AF mode, digital camera 100 is configured to generate the distance image data corresponding to a region wider than the focused region designated from the user. In this way, even if the focused region designated from the user has moved to some extent while digital camera 100 is generating the distance image data, distance image data corresponding to the designated focused region which has moved is generated. As a result, digital camera 100 can execute more appropriate auto focus control.

Second Exemplary Embodiment

A description is made below of a second exemplary embodiment with reference to the drawing. In comparison with the first exemplary embodiment, the second exemplary embodiment is different therefrom in control flow for the whole of digital camera 100 by controller 130 in an event of AF processing. Hence, a description is made here of an operation of the AF processing of digital camera 100 in the second exemplary embodiment. Note that, also in the second exemplary embodiment, a description is made of physical configurations, which are shown in FIG. 1 and FIG. 2, by using the same reference numerals. Moreover, an imaging operation in the second exemplary embodiment is similar to the imaging operation in the first exemplary embodiment, which is shown in FIG. 3.

[2-1. AF Processing of Digital Camera 100]

Figure 6:
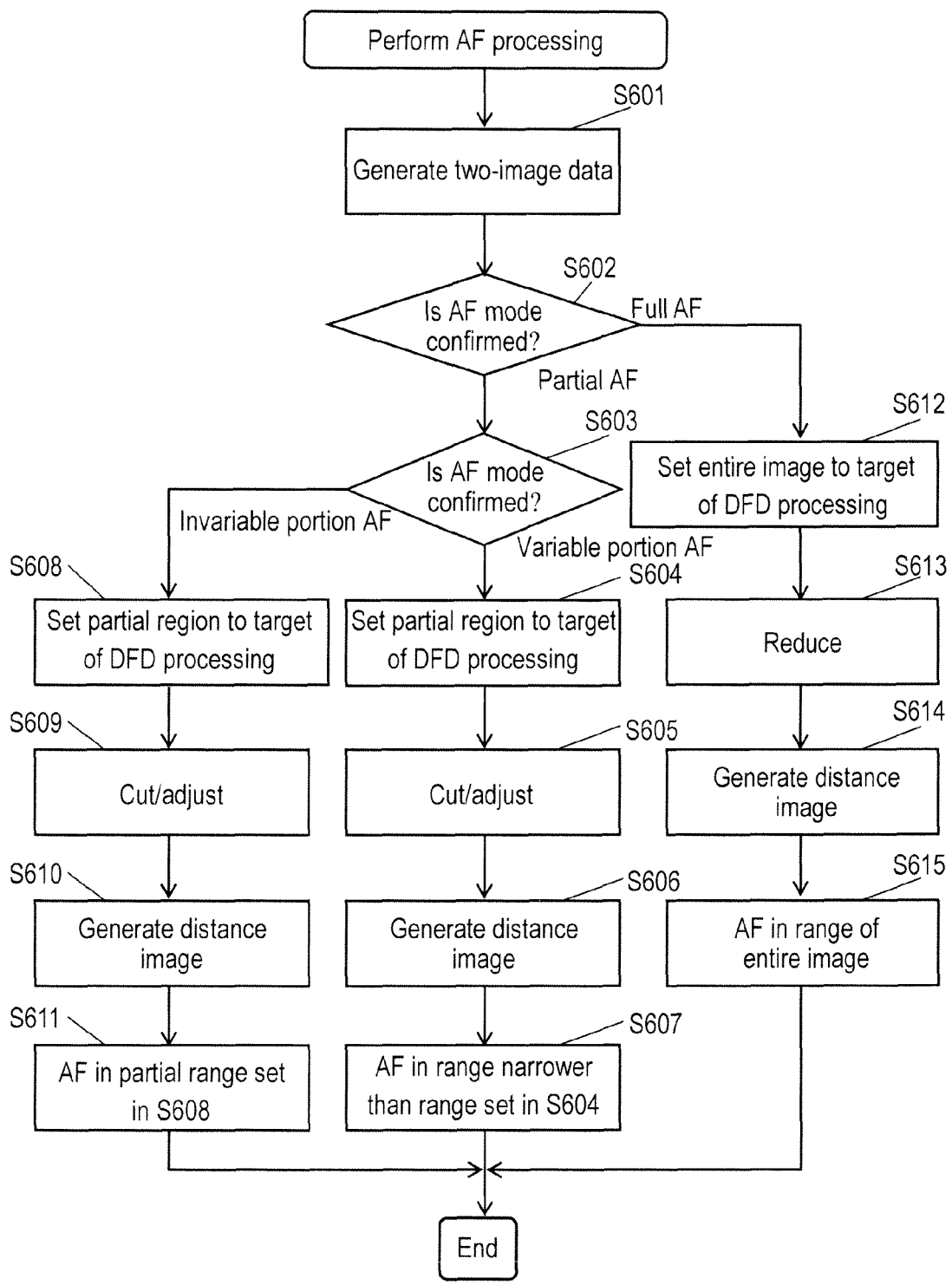
FIG. 6 is a flowchart showing a flow of AF processing according to a second exemplary embodiment.

A description is made of the operation of the AF processing of digital camera 100 according to this exemplary embodiment with reference to FIG. 6. FIG. 6 is a flowchart showing a flow of the AF processing of digital camera 100 according to this exemplary embodiment.

In this exemplary embodiment, upon starting the AF processing in Step S304 shown in FIG. 3, controller 130 controls image processing unit 122 to generate two-image data (S601). Processing in this step is similar to the processing in Step S401 in FIG. 4. When the two-image data is generated, controller 130 determines whether a set AF mode is a full AF mode or a partial AF mode (S602). In a case of determining that the set AF mode is the full AF mode, controller 130 executes processing in Step S612 to Step S615. The processing in Step S612 to Step S615 is similar to the processing in Step S405 to Step S408 in FIG. 4.

Meanwhile, in a case of determining in Step S602 that the set AF mode is the partial AF mode, controller 130 determines whether the partial AF mode thus set is a variable portion AF mode or an invariable portion AF mode (S603). Here, the variable portion AF mode refers to a partial AF mode, where a position of the data to be referred to in the event of auto focus control is variable on the image to be indicated by the image data, in the partial AF mode. For example, such a partial AF mode as a face AF mode and a tracking AF mode, where there is a possibility that a region to be focused move in the image, can be said to be the variable portion AF mode. Moreover, the invariable portion AF mode refers to a partial AF mode, where the position of the data to be referred to in the event of the auto focus control is invariable on the image to be indicated by the image data, in the partial AF mode. For example, such a partial AF mode as a touch AF mode and a center single point AF mode, where there is no possibility that the region to be focused move in the image, can be said to be the invariable portion AF mode.

Upon determining in Step S603 that the partial AF mode is the variable portion AF mode, controller 130 executes processing in Step S604 to Step S607. Here, the processing in Step S604 to Step S607 is similar to the processing in Steps S403, S404, S407 and S408 in FIG. 4.

Meanwhile, upon determining in Step S603 that the partial AF mode is the invariable portion AF mode, controller 130 sets a partial region of the image, which is to be indicated by imaged image data, to a region for use in DFD processing (S608). The region for use in the DFD processing is a region corresponding to a partial region in image data decided as a region to be focused in the invariable portion AF mode. Upon deciding the region for use in the DFD processing, controller 130 executes processing in Steps S609 and S610. The processing in Steps S609 and S610 is similar to the processing in Steps S404 and S407 in FIG. 4.

Upon completing the processing in Step S610, controller 130 decides a position of focus lens 111 based on depth information of the whole, which is included in generated distance image data, and executes the auto focus control (S611). As described above, in this exemplary embodiment, in a case where the set AF mode is the variable portion AF mode, distance image data in a range wider than the focused region is generated, and meanwhile, in a case where the set AF mode is the invariable portion AF mode, distance image data in the same range as the focused region is generated.

[2-2. Effects and the Like]

As described above, digital camera 100 according to this exemplary embodiment includes: CMOS image sensor 120; operation unit 150; and image processing unit 122. CMOS image sensor 120 images a subject image, and generates image data. Operation unit 150 receives a mode setting to either one of the full AF mode and the partial AF mode. Here, the full AF mode is an AF mode of executing the auto focus control by referring to the data corresponding to the entire region of the image to be indicated by the image data. The partial AF mode is an AF mode of executing the auto focus control by referring to the data corresponding to the partial region of the image to be indicated by the image data. Moreover, in response to whether digital camera 100 is set at the full AF mode or the partial AF mode, image processing unit 122 generates first distance image data regarding the depth of the entire region of the image to be indicated by the image data, or second distance image data regarding the depth of the partial region of the image to be indicated by the image data.

Moreover, in a case where digital camera 100 according to this exemplary embodiment is set at the variable portion AF mode, where the position of the data to be referred to in the event of the auto focus control is variable on the image to be indicated by the image data, in the partial AF mode, image processing unit 122 generates first distance image data regarding the depth of a first partial region of the image to be indicated by the image data, and controller 130 refers to the distance image data regarding the depth of a second partial region, which is included in the first partial region and is smaller than the first partial region, and thereby executes the auto focus control. Furthermore, in a case where digital camera 100 is set in the invariable portion AF mode, where the position of the data to be referred to in the event of the auto focus control is invariable on the image to be indicated by the image data, in the partial AF mode, image processing unit 122 generates distance image data regarding the depth of a third partial region of the image to be indicated by the image data, and controller 130 refers to the distance image data regarding the depth of the third partial region, and thereby executes the auto focus control.

That is to say, as mentioned above, in the case where the set AF mode is the variable portion AF mode, digital camera 100 according to this exemplary embodiment generates the distance image data in the range wider than the focused region, and meanwhile, in the case where the set AF mode is the invariable portion AF mode, digital camera 100 generates the distance image data in the same range as the focused region.

In this way, digital camera 100 can execute the auto focus control, which is performed in the case of being set in the invariable portion AF mode, with higher accuracy. Moreover, in the case where digital camera 100 is set in the variable portion AF mode, even if the focused region designated from the user has moved to some extent while digital camera 100 is generating the distance image data, digital camera 100 can generate distance image data corresponding to the designated focused region which has moved.

Other Exemplary Embodiments

As above, the first and second exemplary embodiments have been described as exemplification of the technology disclosed in the present application. However, the technology in the present disclosure is not limited thereto, and is applicable also to exemplary embodiments, which are appropriately subjected to alteration, replacement, addition, omission, and the like. Moreover, it is also possible to constitute new exemplary embodiments by combining the respective constituent elements, which are described in the foregoing first and second exemplary embodiments, with one another.

In this connection, another exemplary embodiment is exemplified below.

In the first and second exemplary embodiments, it is not particularly mentioned whether or not it is possible to make setting at a continuous shooting mode. However, digital camera 100 may be configured so as to be settable in the continuous shooting mode. In that case, in a case of being further set in the continuous shooting mode in an event of being set at a partial AF mode, digital camera 100 may be configured to generate distance image data corresponding to a region wider than a region designated as a focused region. Moreover, in a case of being set at a single shooting mode, digital camera 100 may be configured to generate distance image data corresponding to the same region as the region designated as the focused region. A reason for this is as follows. Specifically, in a case where digital camera 100 is set in the continuous shooting mode, it takes a longer time to complete the imaging than in the case where digital camera 100 is set in the single shooting mode, and as a result, such a possibility that the region to be focused move is also high. Note that the continuous shooting mode is a mode of continuously generating plural-image data by a single imaging instruction from the user. Moreover, the single shooting mode is a mode of generating single-image data by the single imaging instruction from the user.

Moreover, in the first and second embodiments, the size of the image data for use in the DFD processing is predetermined. Hence, the size of the image data for use in the DFD processing is made always constant. However, the image data concerned is not necessarily limited to such a configuration. For example, the size of the image data for use in the DFD processing may be variable. For example, in digital camera 100 the resolving power of the distance image data may be made constant. In this case, digital camera 100 uses larger image data for the DFD processing in the case of being set at a full AF mode than in the case of being set in the partial AF mode. For example, in such a case, in the case of being set in the partial AF mode, digital camera 100 may generate the distance image data in a shorter period than in the case of being set in the full AF mode. In this way, digital camera 100 can realize higher-speed auto focus control.

Moreover, in the first and second exemplary embodiments, classification of the partial AF mode and the full AF mode is made as mentioned above. However, the classification is not limited to such a pattern. For example, a face detection AF mode may be included in the full AF mode. In short, a plurality of AF modes provided in digital camera 100 just need to be classified into the partial AF mode and the full AF mode, and the range in which the distance image data is generated just needs to be changed in response to any of these modes.

Moreover, in the first and second exemplary embodiments, in Step S404, Step S605 and Step S609, the image data obtained by cutting out the partial region from the image data is generated as an input image for the DFD processing. However, the image data concerned is not necessarily limited to such a configuration. For example, readout itself of the image data from CMOS image sensor 120 is switched to readout of the image data of the partial region, and the image data of the partial region is read out, whereby the image data output by CMOS image sensor 120 may be obtained as the image data of the partial region.

Moreover, in the first and second exemplary embodiments, a configuration is adopted, in which the range in which the distance image data is generated is set in response to the type of the AF mode in the AF processing. However, exemplary embodiments are not necessarily limited to such a configuration. For example, the present disclosure may be applied to a manual focus (MF) mode. In the MF mode, when the focus lens is not operated, the entire through image may be displayed, and in addition, the distance image data for the entire image may be generated, and meanwhile, when the focus lens is operated, distance image data for a partial region to be enlargedly displayed may be generated.

For example, the user operates operation unit 150 to switch a focus mode to the MF mode. Moreover, it is supposed that operation unit 150 includes a member for a focus operation by the user. For example, in the following example, it is supposed that the member for the focus operation is a focus ring. At this time, controller 130 instructs lens control unit 105 to move focus lens 111 in response to an operation for the focus ring by the user. Lens control unit 105 drives motor 111M to move focus lens 111 to an instructed position.

In the MF mode, an "MF assist" function is known. The MF assist function is a function that digital camera 100 enlargedly displays a partial region of the through image, which is to be displayed on liquid crystal monitor 123, in response to the operation for the focus ring. Accordingly, when the partial region is enlargedly displayed in response to the operation for the focus ring, this partial region is made as the image data for the DFD processing. Here, controller 130 decides the partial region, which is to be enlargedly displayed, in response to an operation for operation unit 150 by the user. Controller 130 may cut out the partial region, which is desired to be enlargedly displayed, from the image data, and the partial region thus cut out may be made as the image data for the DFD processing. Alternatively, controller 130 may switch the readout itself of the image data from CMOS image sensor 120 to the readout of the image data of the partial region, and the image data, which is output by CMOS image sensor 120, may thereby be made as the image data for the DFD processing.

Then, for the image data for the DFD processing, which is thus obtained, image processing unit 122 performs the processing in Steps S407, S606 and S610, and thereby generates the distance image data. The distance image data obtained in the MF mode can be used for color-coded displaying the region of the through image in response to the depth information of the distance image data.

By adopting such a configuration, when the focus lens is operated in the MF mode, the target region of the DFD processing is limited to the partial region, whereby distance resolving power by the DFD processing can be increased, and visibility of the region concerned by the user can be enhanced.

As above, the exemplary embodiments have been described as the exemplification of the technology in the present disclosure. For this purpose, the accompanying drawings and the detailed description are provided.

Hence, the constituent elements described in the accompanying drawings and the detailed description can include not only constituent elements, which are essential for solving the problem, but also constituent elements, which are provided for exemplifying the above-described technology, and are not essential for solving the problem. Therefore, it should not be immediately recognized that such non-essential constituent elements are essential based on the fact that the non-essential constituent elements are described in the accompanying drawings and the detailed description.

Moreover, the above-mentioned exemplary embodiments are those for exemplifying the technology in the present disclosure, and accordingly, can be subjected to varieties of alterations, replacements, additions, omissions and the like within the scope of the claims or within the scope of equivalents thereof.

What is claimed is:

1. An imaging device comprising:
an image sensor that images a subject image and generates image data;
a user input device that receives a mode setting to either one of a full AF (Auto Focus) mode of executing auto focus control by referring to data corresponding to an entire region of an image to be indicated by the image data and a partial AF mode of executing the auto focus control by referring to data corresponding to a partial region of the image to be indicated by the image data;
an image processor that, in response to whether the mode is the full AF mode or the partial AF mode, generates first distance image data regarding a depth of the entire region of the image to be indicated by the image data or second distance image data regarding a depth of the partial region of the image to be indicated by the image data; and
a controller that executes the auto focus control, wherein:
the image processor generates the first distance image data in a case where the imaging device is set in the full AF mode, and generates the second distance image data in a case where the imaging device is set in the partial AF mode,
the controller executes the auto focus control based on the first distance image data in a case where the first distance image data is generated by the image processor, and executes the auto focus control based on the second distance image data in a case where the second distance image data is generated by the image processor,
in the case where the imaging device is set in the partial AF mode, the image processor generates distance image data regarding a depth of a first partial region, and the controller executes the auto focus control by referring to distance image data regarding a depth of a second partial region that is included in the first partial region and is smaller than the first partial region.

2. The imaging device according to claim 1, wherein:
in a case where the imaging device is set at a variable portion AF mode, where a position of the data to be referred to in an event of the auto focus control is variable on the image to be indicated by the image data, during the execution of the partial AF mode, the image processor generates first distance image data regarding depth of a first partial region of the image to be indicated by the image data, and the controller executes the auto focus control by referring to distance image data regarding a depth of a second partial region that is included in the first partial region and is smaller than the first partial region, and
in a case where the imaging device is set at an invariable portion AF mode, where the position of the data to be referred to in the event of the auto focus control is invariable on the image to be indicated by the image data, during the execution of the partial AF mode, the image processor generates distance image data regarding depth of a third partial region of the image to be indicated by the image data, and the controller executes the auto focus control by referring to the distance image data regarding the depth of the third partial region.

3. The imaging device according to claim 1, wherein a period of generating the second distance image data is shorter than a period of generating the first distance image data.

4. The imaging device according to claim 1, wherein the image processor generates the first distance image data and the second distance image data by using a DFD (Depth From Defocus) algorism.

5. An imaging device comprising:
an image sensor that images a subject image and generates image data;
a user operation device that receives a mode setting to either one of a full AF (Auto Focus) mode of executing auto focus control by referring to data corresponding to an entire region of an image to be indicated by the image data and a partial AF mode of executing the auto focus control by referring to data corresponding to a partial region of the image to be indicated by the image data;
an image processor that, in response to whether the mode is the full AF mode or the partial AF mode, generates first distance image data regarding a depth of the entire region of the image to be indicated by the image data or second distance image data regarding a depth of the partial region of the image to be indicated by the image data; and
a controller that executes the auto focus control, wherein:
the image processor generates the first distance image data in a case where the imaging device is set in the full AF mode, and generates the second distance image data in a case where the imaging device is set in the partial AF mode,
the controller executes the auto focus control based on the first distance image data in a case where the first distance image data is generated by the image processor, and executes the auto focus control based on the second distance image data in a case where the second distance image data is generated by the image processor, the imaging device is settable in a continuous shooting mode of continuously generating plural-image data by a single imaging instruction, and in a case where the imaging device is set both in the continuous shooting mode and the partial AF mode, the image processor generates distance image data regarding a depth of a first partial region of the image to be indicated by the image data, and the controller executes the auto focus control by referring to distance image data regarding a depth of a second partial region that is included in the first partial region and is smaller than the first partial region.

6. The imaging device according to claim 5, wherein:

in a case where the imaging device is set at a variable portion AF mode, where a position of the data to be referred to in an event of the auto focus control is variable on the image to be indicated by the image data, during the execution of the partial AF mode, the image processor generates first distance image data regarding depth of a first partial region of the image to be indicated by the image data, and the controller executes the auto focus control by referring to distance image data regarding a depth of a second partial region that is included in the first partial region and is smaller than the first partial region, and in a case where the imaging device is set at an invariable portion AF mode, where the position of the data to be referred to in the event of the auto focus control is invariable on the image to be indicated by the image data, during the execution of the partial AF mode, the image processor generates distance image data regarding depth of a third partial region of the image to be indicated by the image data, and the controller executes the auto focus control by referring to the distance image data regarding the depth of the third partial region.

7. The imaging device according to claim 5, wherein a period of generating the second distance image data is shorter than a period of generating the first distance image data.

8. The imaging device according to claim 5, wherein the image processor generates the first distance image data and the second distance image data by using a DFD (Depth From Defocus) algorism.

* * * * *